(12) United States Patent
Sze et al.

(10) Patent No.: US 11,412,234 B2
(45) Date of Patent: Aug. 9, 2022

(54) METHOD AND APPARATUS FOR PARALLELIZING CONTEXT SELECTION IN VIDEO PROCESSING

(71) Applicant: TEXAS INSTRUMENTS INCORPORATED, Dallas, TX (US)

(72) Inventors: Vivienne Sze, Cambridge, MA (US); Madhukar Budagavi, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/034,806

(22) Filed: Sep. 28, 2020

(65) Prior Publication Data

US 2021/0014510 A1   Jan. 14, 2021

Related U.S. Application Data

(63) Continuation of application No. 16/155,342, filed on Oct. 9, 2018, now Pat. No. 10,827,188, which is a continuation of application No. 13/415,550, filed on Mar. 8, 2012, now Pat. No. 10,142,637.

(60) Provisional application No. 61/595,277, filed on Feb. 6, 2012, provisional application No. 61/588,476, filed on Jan. 19, 2012, provisional application No. 61/587,492, filed on Jan. 17, 2012, provisional application No. 61/583,351, filed on Jan. 5, 2012, provisional application No. 61/564,121, filed on Nov. 28, 2011, provisional application No. 61/560,565, (Continued)

(51) Int. Cl.
| | | |
|---|---|---|
| *H04N 19/18* | (2014.01) | |
| *H04N 19/176* | (2014.01) | |
| *H04N 19/13* | (2014.01) | |
| *H04N 19/134* | (2014.01) | |
| *H04N 19/436* | (2014.01) | |

(52) U.S. Cl.
CPC ............. *H04N 19/18* (2014.11); *H04N 19/13* (2014.11); *H04N 19/134* (2014.11); *H04N 19/176* (2014.11); *H04N 19/436* (2014.11)

(58) Field of Classification Search
CPC ...... H04N 19/18; H04N 18/13; H04N 19/134; H04N 19/176; H04N 19/346
USPC ........................................................ 345/502
See application file for complete search history.

(56) References Cited

U.S. PATENT DOCUMENTS

| | | | | |
|---|---|---|---|---|
| 6,680,974 B1 * | 1/2004 | Faryar | ................... | H04N 19/60 375/240.18 |
| 2008/0046698 A1 * | 2/2008 | Ahuja | .................. | G06F 9/3875 712/224 |
| 2008/0089421 A1 | 4/2008 | Je-Chang | | |
| 2009/0232204 A1 * | 9/2009 | Lee | ....................... | H04N 19/107 375/240.02 |

(Continued)

OTHER PUBLICATIONS

Cheung Auyeung, Wei Liu, "parallel processing friendly simplified context selection of significance map", JCT-VC Meeting, Jan. 20-28, 2011.

(Continued)

*Primary Examiner* — Jin Ge
(74) *Attorney, Agent, or Firm* — Charles F. Koch; Charles A. Brill; Frank D Cimino

(57) ABSTRACT

A method and apparatus for parallel processing of at least two bins relating to at least one of a video and an image. The method includes determining scan type of at least a portion of the at least one of video and an image, analyzing neighboring position of a bin, removing dependencies of context selection based on the scan type and position of (Continued)

FIRST COLUMN: CONTEXT SELECTION NOT DEPENDENT ON F. NOTE: H, E, AND I DO NOT EXIST FOR THESE POSITIONS

FIRST ROW: CONTEXT SELECTION NOT DEPENDENT ON I. NOTE: B, E, AND F DO NOT EXIST FOR THESE POSITIONS location being encoded in a transform, and performing parallel processing of that least two bins.

10 Claims, 7 Drawing Sheets

Related U.S. Application Data filed on Nov. 16, 2011, provisional application No. 61/453,231, filed on Mar. 16, 2011, provisional application No. 61/450,253, filed on Mar. 8, 2011.

(56) References Cited

U.S. PATENT DOCUMENTS

| | | |
|---|---|---|
| 2010/0020867 A1 | 1/2010 | Wiegand |
| 2010/0284459 A1 | 11/2010 | Jeong |
| 2011/0206135 A1* | 8/2011 | Drugeon .............. H04N 19/129 375/240.24 |
| 2012/0014438 A1 | 1/2012 | Segall |
| 2012/0121011 A1 | 5/2012 | Coban |
| 2012/0140813 A1* | 6/2012 | Sole Rojals ........ H03M 7/4018 375/240.02 |
| 2012/0163455 A1 | 6/2012 | Zheng |
| 2012/0163469 A1 | 6/2012 | Kim |
| 2012/0230417 A1 | 9/2012 | Sole Rojals |

OTHER PUBLICATIONS

Jian Lou, Krit Panusopne, and Limin Wang, "Parallel processing friendly context modeling for significance amp coding in CABAC". JCT-VC Meeting, Jan. 20-28, 2011.

Thomas Wiegand, "Description of video coding technology proposal by Fraunhofer HHI", JCT-VC Metting, Apr. 15-23, 2010.

J. Sole, R. Joshi, I. S. Chong, M. Goban, M. Karczewicz, "Parallel context processing for the significance map in high coding efficiency", JCT-VC Meeting, Jan. 20-28, 2011.

Vadim Seregin, Jianle Chen, "Low-complexity adaptive coefficients scanning", JCT-VC Meeting, Oct. 7-15, 2010.

Chuohao Yeo, Yih Han Tan, Zhengguo Li, "Mode-dependent coefficient scanning for intra prediction residual coding", JCT-VC Meeting, Jan. 20-28, 2011.

Yunfei Zheng, Muhammed Goban, Joel Sole, Rajan Joshi, Marta Karczewicz, "Model dependent coefficient scanning", JCT-VC meeting, Jan. 20-28, 2011.

\* cited by examiner

FIRST ROW: CONTEXT SELECTION NOT DEPENDENT ON I.
NOTE: B, E, AND F DO NOT EXIST FOR THESE POSITIONS

FIRST COLUMN: CONTEXT SELECTION NOT DEPENDENT ON F.
NOTE: H, E, AND I DO NOT EXIST FOR THESE POSITIONS

16x16

POSITION (0,0): CONTEXT SELECTION NOT DEPENDENT ON F

POSITION (3,2): CONTEXT SELECTION NOT DEPENDENT ON F

16x16

DEPEND ON F    DEPEND ON I

FIXED GROUPING OF BINS
| 15 | 13 | 10 | 6 |
| 14 | 11 | 7 | 3 |
| 12 | 8 | 4 | 1 |
| 9 | 5 | 2 | 0 |
FIG. 16
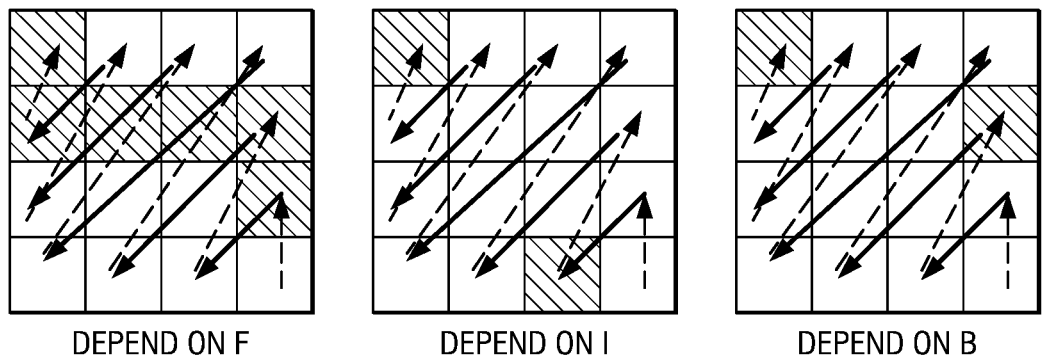
DEPEND ON F        DEPEND ON I        DEPEND ON B
FIG. 17
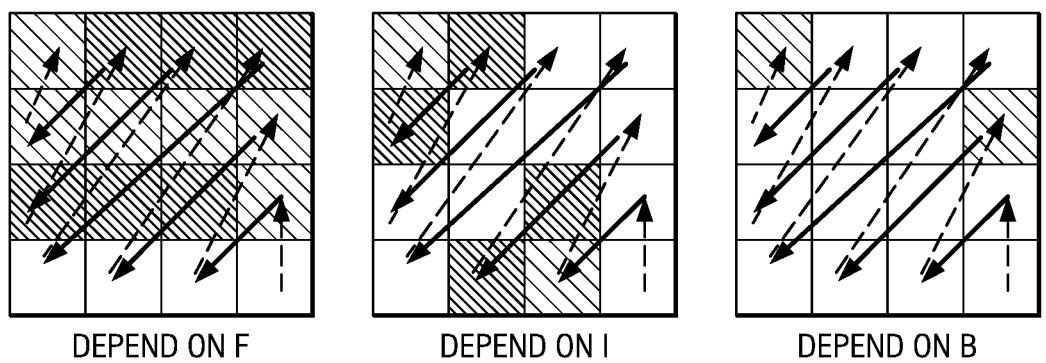
DEPEND ON F        DEPEND ON I        DEPEND ON B
FIG. 18

METHOD AND APPARATUS FOR PARALLELIZING CONTEXT SELECTION IN VIDEO PROCESSING

CROSS-REFERENCE TO RELATED APPLICATIONS

This application is a continuation of prior U.S. patent application Ser. No. 16/155,342, filed on Oct. 9, 2018, which is a continuation of prior U.S. patent application Ser. No. 13/415,550, filed Mar. 8, 2012, (now U.S. Pat. No. 10,142,637), which claims benefit of U.S. provisional patent application Ser. No. 61/450,253 filed Mar. 8, 2011, U.S. provisional patent application Ser. No. 61/453,231 filed Mar. 16, 2011, U.S. provisional patent application Ser. No. 61/560,565 filed Nov. 16, 2011, U.S. provisional patent application Ser. No. 61/564,121 filed on Nov. 28, 2011, 61/583,351 filed on Jan. 5, 2012, U.S. provisional patent application Ser. No. 61/587,492 filed on Jan. 17, 2012, U.S. provisional patent application Ser. No. 61/588,476 filed on Jan. 19, 2012, and U.S. provisional patent application Ser. No. 61/595,277 filed on Feb. 6, 2012, which are herein incorporated by reference in their entireties.

BACKGROUND OF THE INVENTION

Field of the Invention

Embodiments of the present invention generally relate to a method and apparatus for parallelizing context selection in video processing.

Description of the Related Art

In video coding standards, such as H.264/AVC, context modeling is a popular approach used in entropy coding to improve coding efficiency. Context modeling involves selecting a context, which determines the probability used to encode binary symbols. The context selection is sequential and time consuming. Since there are many factors that impact the context selection, such as values of other binary symbols that impact the context selection for the current binary symbol, context selection is difficult to parallelize, particularly during decoding. Parallelizing context selection would result in a more efficient process, cost reduction and potentially better performance.

Therefore, there is a need for a method and/or apparatus for parallelizing context selection.

SUMMARY OF THE INVENTION

Embodiments of the present invention relate to a method and apparatus for parallel processing of at least two bins of the transform coefficient information (e.g. significance map and coefficient levels) relating to at least one of a video and an image. The method includes determining scan type of at least a portion of the at least one of video and an image, analyzing neighboring frequency position of a coefficient within a transform unit of a bin, removing dependencies of context selection based on the scan type and position of location being encoded in a transform, and performing parallel processing of that least two bins.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 16 is an embodiment depicting fixed grouping of the 4 bins per cycle;

FIG. 17 in an embodiment depicting positions in the sub-block that depend on 3 most recently processed bins for 4 bin parallelism;

FIG. 18 is an embodiment depicting the positions in the sub-block that depend on 4 most recently processed bins for 4 bin parallelism;

DETAILED DESCRIPTION

It is beneficial to improve parallel processing capabilities during entropy coding of transform information while maintaining high coding efficiency. Parallel processing is important for high performance and for reducing power consumption, such as reducing the frequency requirement or operational voltage. As such, here the term "position" is intended to refer to the frequency position of a coefficient within a transform unit.

Figure 1:
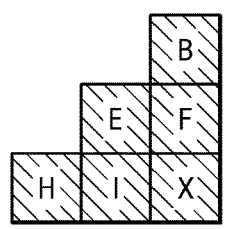
FIG. 1 is an embodiment of dependencies of context selection for significant map for improved coding efficiency.

The significance map indicates the location of the non-zero transform coefficients. For improved coding efficiency, the context selection can depend on the value of the coefficients in neighboring positions, for example, the left, top-left and top directions in the transform. FIG. 1 is an embodiment of dependencies of context selection for significant map for improved coding efficiency. As shown in FIG. 1, position X depends on positions B, E, F, H and I as shown in FIG. 1, where position X is a position within the transform. With this dependency, it is difficult to select the context to decode multiple bins of different positions at the same time.

Figure 2:
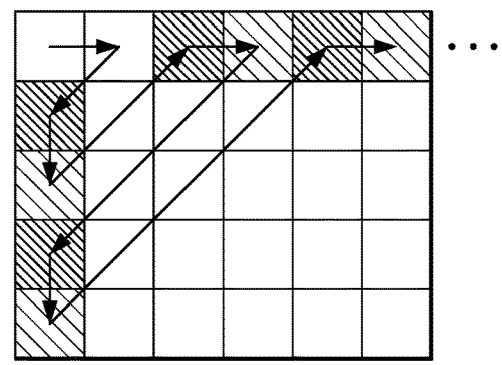
FIG. 2 is an embodiment for processing the significant coefficient flag.

FIG. 2 is an embodiment for processing the significant coefficient flag. When processing the significant coefficient flag in positions highlighted in grey, which are every other position in first row and every other position in first column, there is dependency on previously decoded bin highlighted in black. Such dependencies occur at the edges of the transform.

To improve parallel processing of context selection, dependency will be a challenge for parallel decoding of two bins or more at a time. For example, when switching from diagonal to diagonal in zig-zag scanning, the context selection for the current bin depends on the value of the previously decoded bin, as shown in FIG. 2. Such a selection is unbeneficial for two bin parallel coding.

Figure 3:
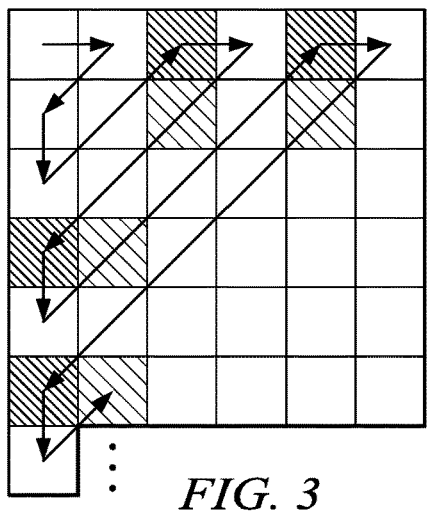
FIG. 3 is an embodiment for additional dependency challenges for parallel decoding of three bins at a time.

There are additional dependencies for decoding 3 or 4 bins in parallel. FIG. 3 is an embodiment for additional dependency challenges for parallel decoding of three bins at a time. Such dependency may be in addition to the dependencies shown in FIG. 2. When processing the significant coefficient flag in the grey positions, which are every other position in second row and every other position in second column, there is dependency on decoded bin highlighted in black, which are two positions away in the zig-zag scan.

Figure 4:
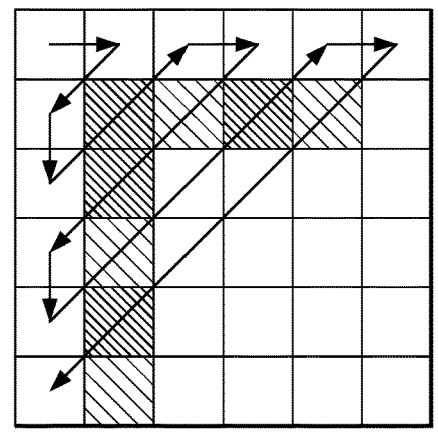
FIG. 4 is an embodiment depicting additional dependency challenges for parallel decoding of four bins at a time.

FIG. 4 is an embodiment depicting additional dependency challenges for parallel decoding of four bins at a time. When processing the significant coefficient flag in the positions highlighted in grey, which are every other position in second row and every other position in second column, there is dependency on decoded bin highlighted in black, which are three positions away in the zig-zag scan. As shown in FIG. 3 and FIG. 4, respectively, the positions in the second row and column are affected. In other words, for positions highlighted in grey in FIGS. 2, 3 and 4, speculative computations are required to decode two, three and four bins in parallel. For example, parallel processing may require that grey positions are decoded at the same time as the black position; however, the grey positions depend on the black position. As a result, parallel processing is hindered.

Figure 5:
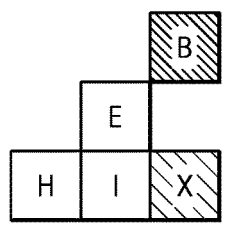
FIG. 5 is an embodiment depicting removing dependencies to enable least two bin processing.
Figure 5:
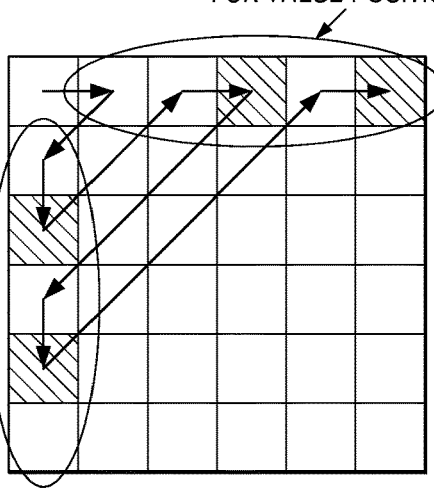
Figure 5:
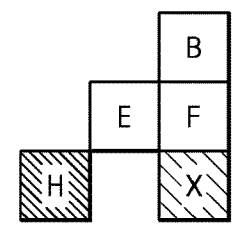

FIG. 5 is an embodiment depicting removing dependencies on neighbors to enable two bin parallel processing. In FIG. 5, the dependency to the immediate top neighbor dependency on the positions in the first column is removed. In other embodiments, dependency of all position in the first column or only positions highlighted in grey may be removed. In addition, as shown in FIG. 5, the dependency to the immediate left neighbor for the positions in the first row is removed. In other embodiments, dependency of all position in the first row or only positions highlighted in grey may be removed.

There many ways to calculate context index. In one embodiment, neighbors may be used to calculation the context index: When there are 5 neighbors, for each of the five neighbors, determine if the value is greater than 1. The number of neighbors that are greater than 1 is used to calculate the context index. Hence, the sum can range is between 0 and 5. This sum can then be mapped to a context index. When 4 neighbors need to be removed, either the sum can range from 0 to 4, or a neighbor can be double counted so that the sum can range from 0 to 5.

Removed neighbors are not included in the calculation of the context index. So, if any of the neighbors are greater than 1, then the sum may range between 0 and 4 and mapped to a context index. In one embodiment, a neighbor may count for twice. In such a case, though 4 neighbors are being considered, a sum ranging between 0 and 5 is expected. In other embodiments, the number of neighbors may be truncated to stay below a specific number of neighbors for consideration.

As such, reducing context dependencies for the significant coefficient flag in positions highlighted in grey of FIG. 2, FIG. 3 and FIG. 4 enables parallel processing of the bins. For example, removing dependency on I, which is the immediate left neighbor, on positions in the first row, and removing dependency on F, which is the immediate top neighbor, on positions in the first column enables two bin parallel processing.

For example, the dependency may be removed for the highlight blue positions or for all the positions in the first row and first column. In one embodiment, the coding loss for reducing the dependency for context selection of significant coefficient flag in all positions of the first row and first column is 0.1%, which was measured under common test conditions for HEVC with HM-2.0. In another embodiment, coding loss for reduced dependency for only the grey positions is 0.1 to 0.3%. An additional benefit of reducing the dependency for all positions in first row and first column is that there are fewer checks that need to be done to identify the positions with reduced dependency.

Figure 6:
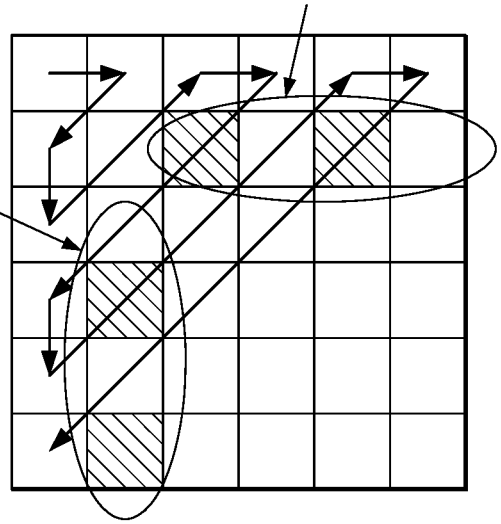
FIG. 6 is an embodiment depicting removing dependencies to enable at least three bins.

FIG. 6 is an embodiment depicting removing dependencies on neighbors to enable parallel processing of at least three bins. In FIG. 6, the dependencies to the immediate left neighbor for the positions in the second column are removed. In other embodiments, all position in the second column or only positions highlighted in grey may be removed. Also, in FIG. 6, the dependencies to the immediate top neighbor for the positions in the second row are removed. In other embodiments, dependencies on all position in the second row or only positions highlighted in grey may be removed. In one embodiment, to enable three bin processing, additional dependency must be removed for positions in the second row and column, as shown in FIG. 6. Three bin parallel processing may also require the reduced dependency modifications shown in FIG. 5.

Figure 7:
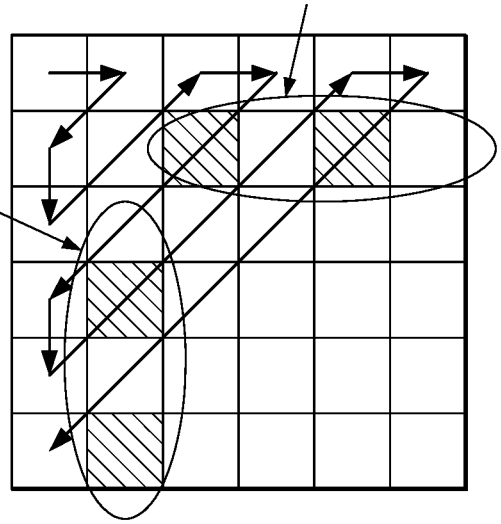
FIG. 7 is an embodiment depicting removing dependencies in parallel processing to enable least four bins.

FIG. 7 is an embodiment depicting removing dependencies on neighbors to enable parallel processing of at least four bins. In FIG. 7, the dependency to the immediate top and left neighbors for the positions in the second column is removed. In other embodiments, dependencies all position in the second column or only positions highlighted in grey may be removed. Also, as shown in FIG. 7, the dependency to the immediate top and left neighbors for the positions in the second row is removed. In Other embodiments, dependencies of all positions in the second row or only positions highlighted in grey may be removed. In FIG. 7 depicts an example with additional dependency removal for four or five bin processing. In one embodiment, four or five bin parallelism may also require the reduced dependency modifications shown in FIG. 5 and FIG. 6.

Figure 8:
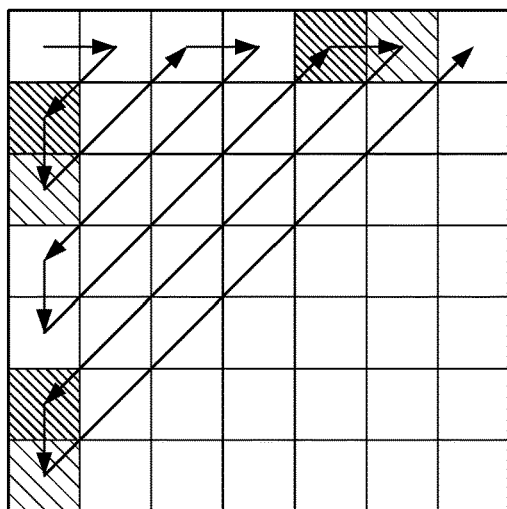
FIG. 8 is an embodiment depicting wherein only positions in grey reduce dependency on neighbors.

Hence, removing context selection dependencies that cause dependencies between recently processed bins or bins that may be processed in parallel is beneficial to minimize complexity, facilitate parallel processing and improve performance. As such, dependencies may be removed or reduced from all positions in the rows or columns near the edges, or for a subset of positions. Another example, in addition to the ones given in FIG. 5 to FIG. 7 would be in FIG. 8. In FIG. 8 is an embodiment depicting wherein only positions in grey reduce dependency on neighbors. Thus, additional examples of reducing neighboring dependencies for selected position can be seen for different scans and different degrees of parallelism.

Accordingly, in one embodiment, the mask is modified to facilitate parallel decoding. By modifying the mask may exclude pixel location that has been calculated. For example, when using zig-zag scans, the mask has a new shape with position X, of FIG. 1, on top. Thus, dependencies also change accordingly.

Thus, in one embodiment, dependencies on neighbors for context selection of significant coefficient flag are reduced at positions near the edge of the transform when switching from one diagonal to another. Specifically, dependency between N bins being processed in parallel is undesirable since it requires speculative computation. When those N bins occupy different diagonals, the dependency on top and/or left neighbor should be removed. Such an approach may be applied to any type of scan, such as, zig-zag (forward or reverse), diagonal, sub-block diagonal, vertical, horizontal. For example, in the case of vertical, if the N bins occupy different columns, or for horizontal scan if the N bins occupy different rows, remove dependency between bins.

The reduction of neighboring dependency depending on position extend to other syntax elements with neighboring dependencies for context selection, such as, syntax elements that describe coefficient levels (coeff_abs_level_greater1_flag, coeff_abs_level_greater2 flag). Furthermore, a neighbor may be weighted higher than another to account for the removed neighbors. For example, a nearest neighbor can be double counted to account for the affect of the removed neighbor. Similarly, extra neighbors may be truncated to maintain a specific number of context selections.

In one embodiment, a reduced dependency can be assigned to specific positions in each row/column or it may be assigned to all positions within a given row or column in order to reduce checks/logics required to identify the position. In one embodiment only those positions that are affected by the wrapping of N bins across different diagonals are removed. In other words, the template of the neighboring dependency may change depending on the position within the significance map.

In yet another embodiment, reduction of neighboring dependency may be based on position corresponding to other syntax elements where there are neighboring dependencies for context selection, such as, coefficient levels. Certain neighbors can be weighted higher to account for the removed neighbors. For example, the nearest neighbor can be double counted to account for the affect of the removed neighbor.

Removing neighboring dependency can be applied to embodiments that utilize any scan type, such as, forward zig-zag, reverse zig-zag, diagonal, sub-block diagonal, vertical, horizontal and the likes. For example, when using a reverse diagonal scan the neighboring dependencies are modified to be in the bottom right corner. While the diagonal scan addresses dependencies at some of the transform edges, there still remain dependencies near the corners of the significance map.

Figure 9:
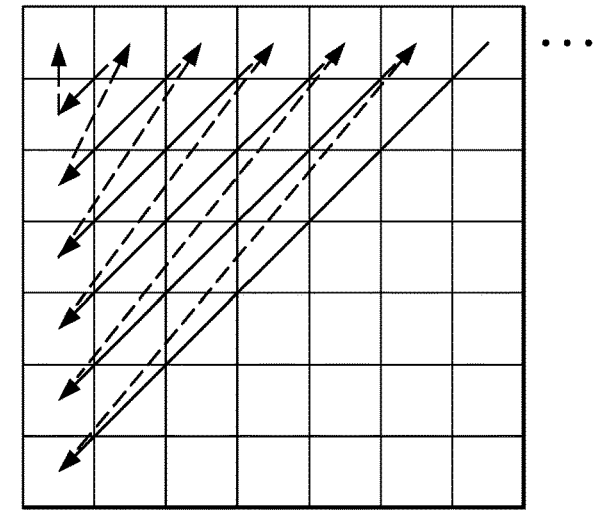
FIG. 9 is an embodiment depicting a reverse diagonal scan.
Figure 10:
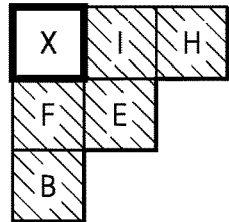
FIG. 10 is an embodiment of dependencies of context selection for significant map for improved coding efficiency when scan is reversed.

FIG. 9 is an embodiment depicting a reverse diagonal scan. As shown in FIG. 9, when using a reverse diagonal scan, the neighboring dependencies are modified to be in the bottom right corner, as shown in FIG. 10. FIG. 10 is an embodiment of dependencies of context selection for significant map for improved coding efficiency when scan is reversed, i.e. from high frequency to low frequency. While the diagonal scan addresses dependencies at some of the transform edges, there still remain dependencies near the corners of the significance map. For instance, for positions (x,y)=(0,0) and (N−2,0), where N is the width of the significance map (transform), position X will depend on its previously processed neighbors F. Thus, for 2-bin parallel processing, it is recommended that this neighbor be removed from those two positions, as shown in FIG. 11.

Figure 11:
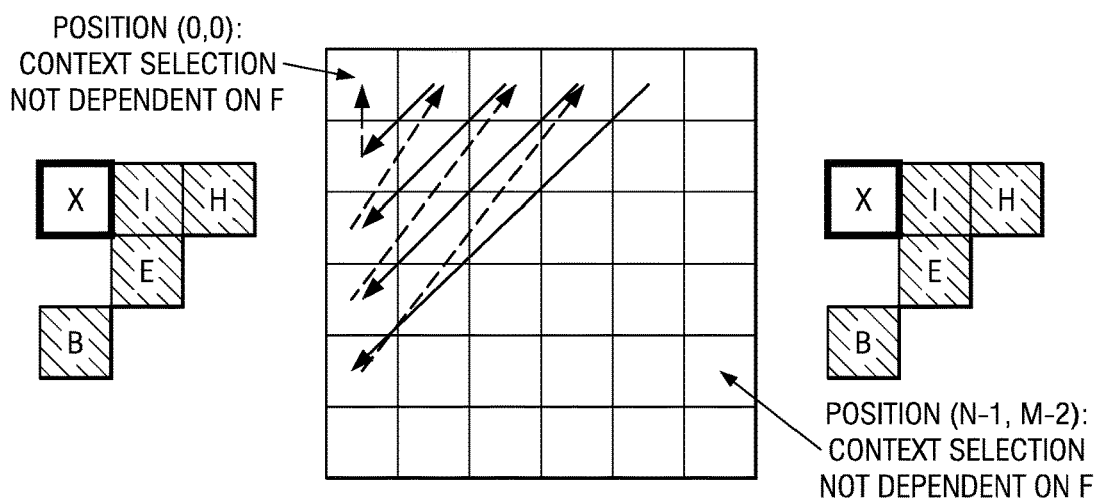
FIG. 11 is an embodiment of parallel processing of at least two bins.
Figure 12:
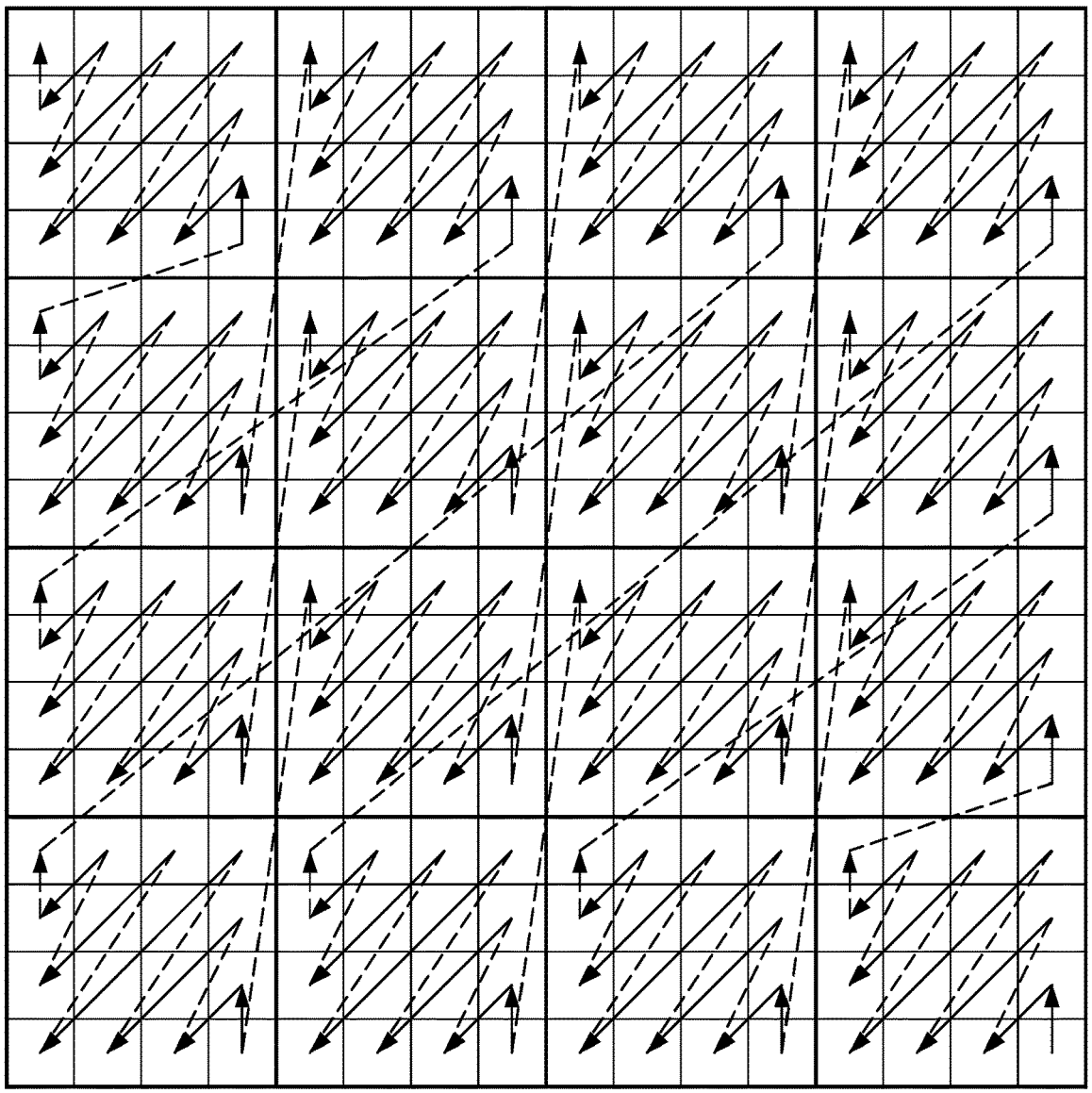
FIG. 12 demonstrates a 16×16 transform unit (TU) divided into 16 4×4 sub-blocks.

FIG. 11 is an embodiment of parallel processing of at least two bins. In FIG. 11 the dependency to the immediate bottom neighbor for the position (0,0) and (N−1, M−2) is removed, where N and M are the width and height of the significance map, respectively. FIG. 12 is an embodiment depicting reverse diagonal sub-block scan. FIG. 12 demonstrates a 16×16 transform unit (TU) divided into 16 4×4 sub-blocks. A similar application may be presented for a 32×32 TU divided into 64 4×4 sub-blocks.

Figure 13:
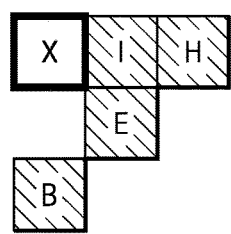
FIG. 13 is an embodiment depicting parallel processing of at least two bins for 4×4 diagonal sub-block scan.
Figure 13:
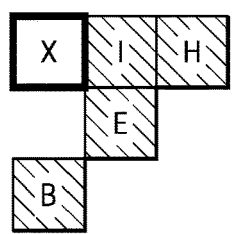
Figure 14:
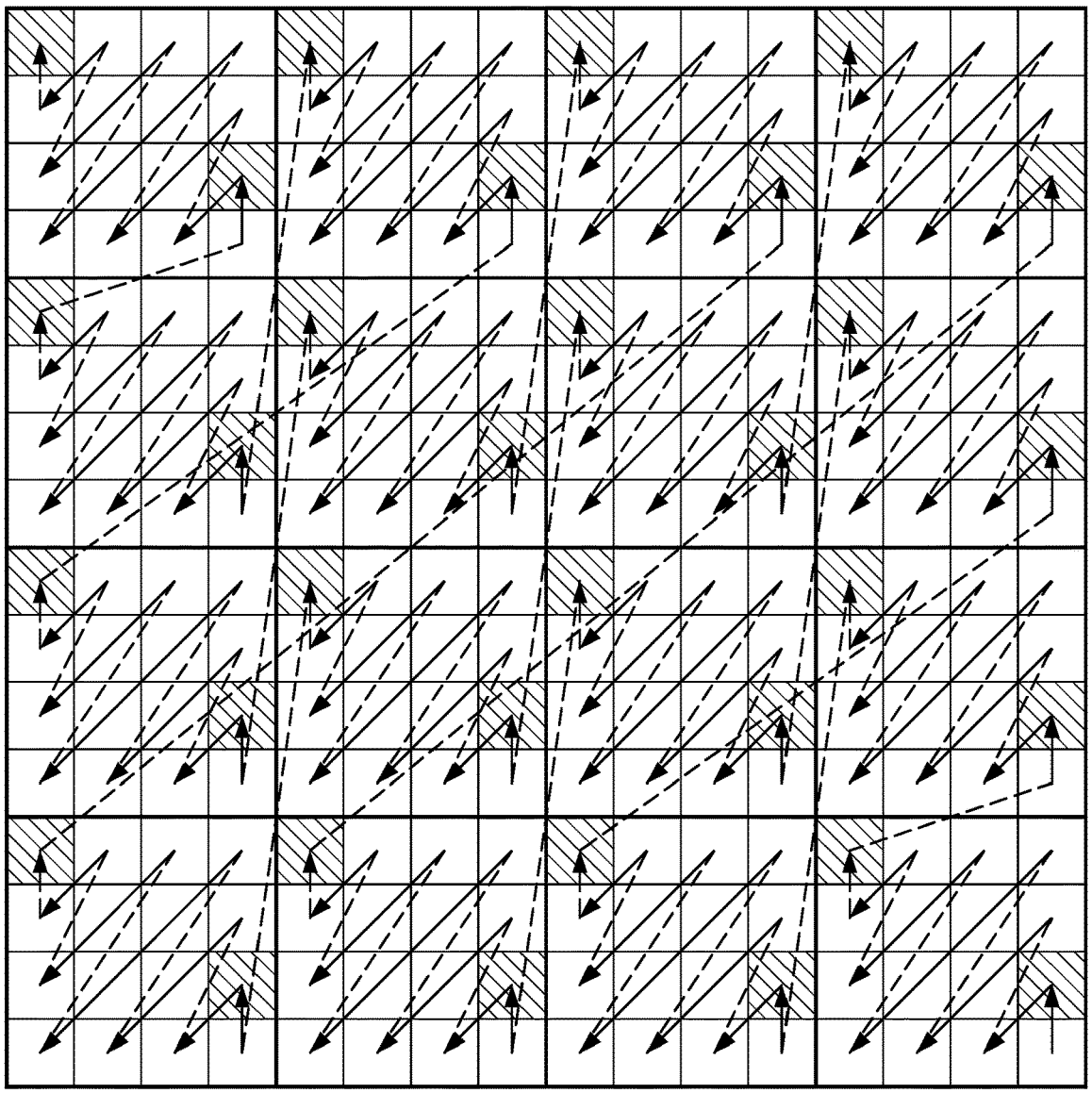
FIG. 14 is an embodiment depicting positions highlighted in grey in 16×16 TU that do not use F neighbor for context selection of significant coefficient flag.

FIG. 13 is an embodiment depicting parallel processing of at least two bins for 4×4 diagonal sub-block scan. In FIG. 13, the dependency to the immediate bottom neighbor for the position (0,0) and (3,2) is removed. If sub-block scans are used, where the significance map is broken into 4×4 sub-blocks, as shown in FIG. 12, then this approach can be extended by removing neighbors F and I for positions (x,y)=(0,0) and (2, 0) respectively within the sub-block, as shown in FIG. 13. FIG. 14 is an embodiment depicting positions highlighted in grey in 16×16 TU that do not use F neighbor for context selection of significant coefficient flag.

Figure 15:
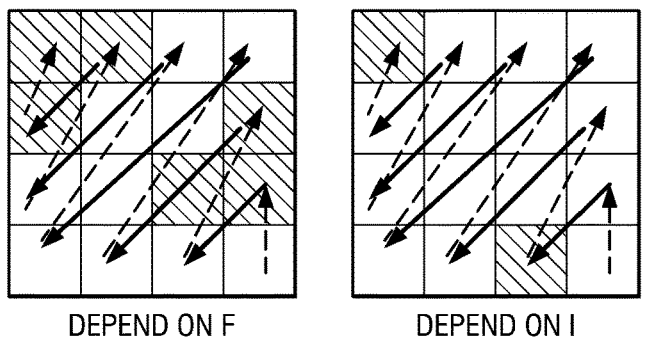
FIG. 15 is an embodiment depicting the positions in the sub-block that depend on 2 most recently processed bins.

FIG. 15 is an embodiment depicting the positions in the sub-block that depend on 2 most recently processed bins. For 3-bin parallelism, additional neighbors need to be removed to ensure that there are no dependencies across all three bins being processed in parallel. For instance, in FIG. 15, several positions highlighted in grey depend on F and I. Due to the dependence on the five neighbors, as shown in FIG. 10, can be found near corners shown in grey. For the positions highlighted in grey in left of FIG. 15, dependencies on neighbor F are removed. For the positions highlighted in grey in right of FIG. 15, dependencies on neighbor I are removed.

FIG. 16 is an embodiment depicting fixed grouping of the 4 bins per cycle. For 4-bin parallelism, dependency on neighbor B should also be removed in some positions. To minimize context selection logic complexity, for example, for 4-bin parallelism, the bins may be grouped, as shown in FIG. 16. FIG. 17 in an embodiment depicting positions in the sub-block that depend on 3 most recently processed bins for 4 bin parallelism. As shown in FIG. 17, dependencies are removed in order to enable 4 bin parallel processing. In other embodiment, additional dependencies may be removed in order to simplify context selection logic.

As such, since 4×4 sub-block is a multiple of 4, when doing 4 bins per cycle, the positions do not shift. Thus, positions may directly be mapped to a bin order within a cycle; for example, position 4 is the $1^{st}$ bin, position 5 is the $2^{nd}$ bin, position 6 is the $3^{rd}$ bin, and position 7 is the $4^{th}$ bin; this would be consistent across all cycles. As a result, only dependencies within a group matters to enable parallel. Note that dependencies across groups matters less. For example, in FIG. 16, if 0, 1, 2, and 3 are group 1; 4, 5, 6, and 7 are group 2; 8, 9, 10 and 11 are group 3; and 12, 13, 14 and 15 are group 4. Then position 13 can depend on position 10 for 4 bin processing. This is different from 3-bin per cycle processing, which does not equally divide to 4×4 sub-blocks. Thus, the positions may not be mapped to a certain bin order. For instance, in some cycles, position 6 is the $1^{st}$ bin, but in other cycles position 6 may be the $2^{nd}$ bin or $3^{rd}$ bin.

FIG. 18 is an embodiment depicting the positions in the sub-block that depend on 4 most recently processed bins for 4 bin parallelism. For general 4-bin parallelism, without grouping, the neighboring dependencies that need to be removed are shown in FIG. 18. Accordingly, removing dependencies on neighbors, including dependencies at the edge of a transform, based on neighboring positions selected based on scan type reduces the amount of speculation required, reduces cost and improves performance.

Figure 19:
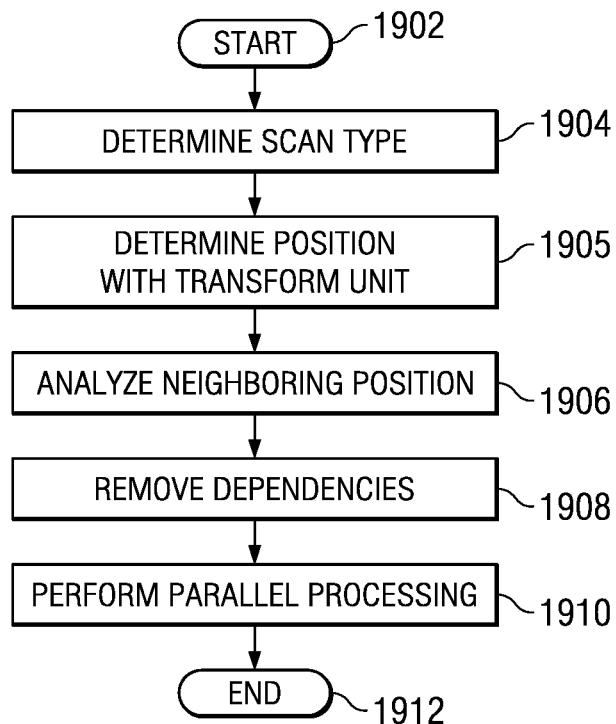
FIG. 19 is an embodiment of a method 900 for a digital processor for processing video/image.

FIG. 19 is an embodiment of a method 1900 for a digital processor for processing video/image. The method starts at step 1902 and proceeds to step 1904. At step 1904, the method 1900 determines the scan type. At step 1905, the method 1900 determine position with transform unit, wherein the method 1900 determines which neighbor processed most recently based on the scan type at step 1906, the method 1900 analyzes neighboring position. At step 1908, the method 1900 removes dependencies of context selection for significant map based on the scan type and neighboring positions analysis. At step 1910, the method 1900 performs parallel processing. The method 1900 ends at step 1912. It should be noted that not all steps are required. For example, the method 1900 may not need to determine the scan type.

Figure 20:
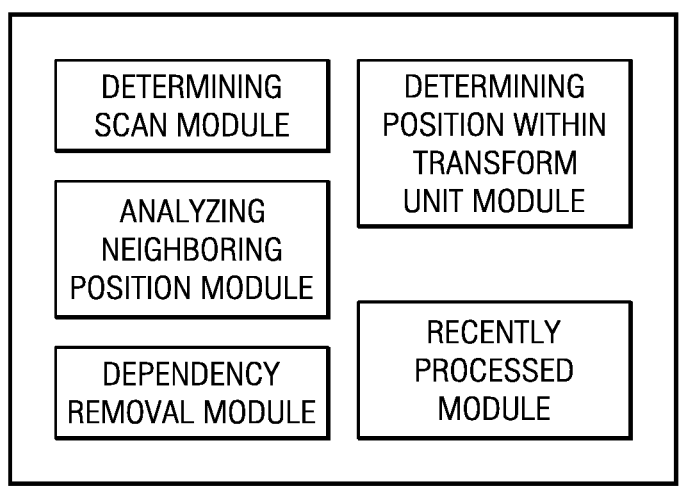
FIG. 20 is an embodiment of an apparatus for enabling parallel processing in processing a video and/or an image.

FIG. 20 is an embodiment of an apparatus for enabling parallel processing in processing a video and/or an image. The apparatus includes a means for determining scan type, a means for determining position within transform unit, means for analyzing neighboring positions, means based on the scan of determining neighbors what would most recently be processed, means for removing such dependency from consideration when processing a video, and means for processing video, wherein such means can parallel process video. The means for determining scar type can determine if the scan is a forward zig-zag, reverse zig-zag, diagonal, horizontal, vertical, diagonal sub-block, etc. The means for analyzing neighboring positions is capable of determine which dependency may be removed. The means for processing video can parallel process video. Such apparatus may be utilized for decoding video, encoding video or both. Such an apparatus may generate video for display or video related data. Furthermore, such an apparatus may be coupled to an image/video capturing device or may retrieve such data, real-time or from memory at a later time. In should be noted that the elements of such an apparatus may be coupled across various components, joined in the same component or simply communicating together.

The method and apparatus for parallel video processing may be utilized in systems such as, broadcast systems, video on demand systems, home cinema, surveillance, real-time communications video chat/conference, telepresence, mobile streaming, mobile broadcast, mobile communications, storage and playback video, camcorders, cameras, dvd players, internet streaming, internet download, internet play, remote video presentation, remote computer graphics display, and the likes.

While the foregoing is directed to embodiments of the present invention, other and further embodiments of the invention may be devised without departing from the basic scope thereof, and the scope thereof is determined by the claims that follow.

What is claimed is:

1. A method comprising:
    receiving, by a processor, an image comprising a block and the block comprising bins;
    determining whether a selected bin is in a leftmost column of the block, wherein the selected bin includes a plurality of neighbors;
    in response to determining that the selected bin is in the leftmost column of the block, removing a first neighbor of the plurality of neighbors, the first neighbor including a first context selection dependency directly above the selected bin;
    in response to removing the first neighbor, increasing, by the processor, a weight of a second neighbor; and
    processing, by the processor, the selected bin to generate a decoded image.

2. The method of claim 1, further comprising removing a third neighbor, wherein the third neighbor includes a context selection dependency directly to a left of the selected bin, in response to determining that the selected bin is in a top row.

3. The method of claim 1, further comprising:
    removing a third neighbor, wherein the third neighbor includes a context selection dependency directly above the selected bin of the bins, in response to determining that the selected bin is in a column second from a left; and
    removing a fourth neighbor, wherein the fourth neighbor includes a context selection dependency directly to the left of the selected bin, in response to determining that the selected bin is in a row second from a top.

4. The method of claim 3, further comprising:
    removing a fifth neighbor, wherein the fifth neighbor includes a context selection dependency directly left of the selected bin of the bins, in response to determining that the selected bin is in a column second from the left; and
    removing a sixth neighbor, wherein the sixth neighbor includes a context selection dependency directly above the selected bin, in response to determining that the selected bin is in a row second from the top.

5. The method of claim 1, further comprising displaying the decoded image.

6. An apparatus comprising:
    a receiver configured to receive an image, the image comprising a block and the block comprising bins;
    a processor coupled to the receiver, the processor configured to:
        determine whether a selected bin is in a leftmost column of a block, wherein the selected bin includes a plurality of neighbors;
        in response to determining that the selected bin is in the leftmost column of the block, remove a first neighbor of the plurality of neighbors, the first neighbor including a first context selection dependency directly above a selected bin of the bins;
        in response to removing the first neighbor, increase a weight of a second neighbor; and
        process the selected bin to generate a decoded image.

7. The apparatus of claim 6, wherein the processor is further configured to remove a third neighbor, wherein the third neighbor includes a context selection dependency directly to a left of the selected bin, in response to determining that the selected bin is in a top row.

8. The apparatus of claim 6, wherein the processor is further configured to:
    remove a third neighbor, wherein the third neighbor includes a context selection dependency directly above the selected bin of the bins, in response to determining that the selected bin is in a column second from a left; and
    remove a fourth neighbor, wherein the fourth neighbor includes a context selection dependency directly to the left of the selected bin, in response to determining that the selected bin is in a row second from a top.

9. The apparatus of claim 8, wherein the processor is further configured to:
  remove a fifth neighbor, wherein the fifth neighbor includes a context selection dependency directly left of the selected bin of the bins, in response to determining that the selected bin is in a column second from the left; and
  remove a sixth neighbor, wherein the sixth neighbor includes a context selection dependency directly above the selected bin, in response to determining that the selected bin is in a row second from the top.

10. The apparatus of claim 6, further comprising a display for displaying the decoded image.

\* \* \* \* \*